(12) United States Patent
Ul-Haq et al.

(10) Patent No.: US 11,753,492 B2
(45) Date of Patent: Sep. 12, 2023

(54) ACRYLOYL BASED POLYMERS WITH ACTIVE END CAP AS CORROSION INHIBITORS

(71) Applicant: Saudi Arabian Oil Company, Dhahran (SA)

(72) Inventors: Imran Ul-Haq, Dhahran (SA); Abdullah Al-Malki, Dammam (SA); Manal Al-Eid, Dhahran (SA); Hassan Ali Al-Ajwad, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/749,698

(22) Filed: May 20, 2022

(65) Prior Publication Data

US 2022/0275128 A1 Sep. 1, 2022

Related U.S. Application Data

(62) Division of application No. 16/708,131, filed on Dec. 9, 2019, now abandoned.

(51) Int. Cl.
*C09K 8/54* (2006.01)
*C08F 226/08* (2006.01)
*C08F 220/06* (2006.01)

(52) U.S. Cl.
CPC .......... *C08F 226/08* (2013.01); *C08F 220/06* (2013.01); *C09K 8/54* (2013.01)

(58) Field of Classification Search
CPC .... C08F 226/08; C08F 220/06; C08F 220/54; C09K 8/54; C09K 2208/32; C09K 8/52
See application file for complete search history.

(56) References Cited

U.S. PATENT DOCUMENTS

| | | | |
|---|---|---|---|
| 4,180,689 | A | 12/1979 | Davies et al. |
| 4,740,292 | A | 4/1988 | Chen et al. |
| 5,939,362 | A | 8/1999 | Johnson et al. |
| 6,232,273 | B1 | 5/2001 | Namba et al. |
| 8,951,498 | B2 | 2/2015 | Larsen et al. |
| 9,145,465 | B2 | 9/2015 | Spencer et al. |
| 9,493,598 | B2 | 11/2016 | Musa et al. |
| 2011/0277844 | A1 | 11/2011 | Musa et al. |
| 2012/0025882 | A1 | 2/2012 | Shanan |
| 2013/0123147 | A1 | 5/2013 | Musa et al. |
| 2015/0322330 | A1 | 11/2015 | Spencer et al. |
| 2017/0321108 | A1 | 11/2017 | Majnouni et al. |
| 2019/0168197 | A1 | 6/2019 | Corma Canos et al. |

FOREIGN PATENT DOCUMENTS

| | | |
|---|---|---|
| AU | 465697 | 10/1972 |
| AU | 2014413311 | 7/2017 |
| CN | 106430235 | 2/2017 |
| EP | 0186447 | 1/1991 |
| EP | 2449153 | 1/2019 |
| JP | H 09221515 | 8/1997 |
| WO | WO 1993025798 | 12/1993 |
| WO | WO 1998051902 | 11/1998 |
| WO | WO 2013059058 | 4/2013 |
| WO | WO2017/192689 | * 11/2017 |
| WO | WO 2017192298 | 11/2017 |
| WO | WO 2017192689 | 11/2017 |
| WO | WO 2017202495 | 11/2017 |

OTHER PUBLICATIONS

Akhtar et al., "Aromatization of alkanes over Pt promoted conventional and mesoporous gallosilicates of MEL zeolite," Catalysis Today, Jan. 2012, 179(1):61-72, 12 pages.
Bhattacharya et al., "Aromatization of n-hexane over H-ZSM-5: Influence of promoters and added gases," Applied Catalysis A: General, Jul. 1996, 141(1-2):105-115, 11 pages.
Bibby et al., "NH4+-tetraalkyl ammonium systems in the synthesis of zeolites," Nature, May 1980, 285(5759):30-31, 2 pages.
Camblor et al., "Characterization of nanocrystalline zeolite Beta," Microporous and Mesoporous Materials, Dec. 1998, 25(1-3):59-74, 16 pages.
Camblor et al, "Synthesis of nanocrystalline zeolite beta in the absence of alkali metal cations," Studies in Surface Science and Catalysis, 1997, 105:341-348, 7 pages.
Ding et al., "Effect of agitation on the synthesis of zeolite beta and its synthesis mechanism in absence of alkali cations," Microporous and Mesoporous Materials, Sep. 2006, 94(1-3):1-8, 8 pages.
Dyballa et al., "Parameters influencing the selectivity to propene in the MTO conversion on 10-ring zeolites: directly synthesized zeolites ZSM-5, ZSM-11, and ZSM-22," Applied Catalysis A: General, Jan. 2016, 510, 41 pages.
Farrusseng et al., "Zeolite-Encapsulated Catalysts: Challenges and Prospects," Encapsulated Catalysts, 2017, Chapter 11, pp. 335-386, 52 pages.
Garcia-Martinez et al., "A mesostructured Y zeolite as a superior FCC catalyst—from lab to refinery," Chem. Commun., Aug. 2012, 48(97):11841-11843, 3 pages.
Ghamami et al, "Synthesis and crystal growth of zeolite (NH4, TPA)-ZSM-5," Zeolites, Apr. 1983, 3(2):155-162, 8 pages.
Hou et al., "Nucleation and Growth of NH4-ZSM-5 Zeolites," Studies in Surface Science and Catalysis, 1986, 28:239-246, 8 pages.
Kalita et al, "Studies on stability of nanocrystalline MFI zeolite synthesized by a novel method against OH—attack," Materials Chemistry and Physics, vol. 129, issue 1-2, Sep. 2011, pp. 371-379, 9 pages.

(Continued)

*Primary Examiner* — Kumar R Bhushan
(74) *Attorney, Agent, or Firm* — Fish & Richardson P.C.

(57) ABSTRACT

A corrosion inhibiting polymer is provided. The corrosion inhibiting polymer has a general formula of:

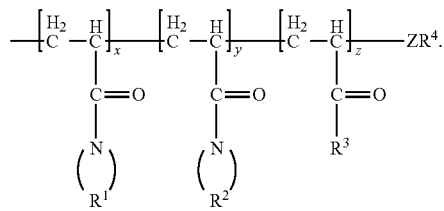

6 Claims, 2 Drawing Sheets

(56) References Cited

OTHER PUBLICATIONS

Kim et al, "Oligomerization and isomerization of dicyclopentadiene over mesoporous materials produced from zeolite beta," Catalysis Today, 232, Sep. 2014, pp. 69-74, 6 pages.

Landau et al., "Colloidal Nanocrystals of Zeolite β Stabilized in Alumina Matrix," Chem. Mater., Apr. 1999, 11(8):2030-2037, 8 pages.

Li et al., "Realizing the Commercial Potential of Hierarchical Zeolites: New Opportunities in Catalytic Cracking," Chem Cat Chem Review, Sep. 2013, 6(10):46-66, 22 pages.

Liu et al., "Synthesis, characterization, and catalytic performance of hierarchical ZSM-11 zeolite synthesized via dual-template route," Chinese Journal of Catalysis, Jan. 2018, 39(1):167-180, 14 pages.

Ma et al, "A review of zeolite-like porous materials," Microporous and Mesoporous Materials, May 2000, 37(1-2):243-252, 10 pages.

Manimaran et al., "Corrosion Inhibition of carbon steel by polyacrylamide," Research Journal of Chemical Sciences, Mar. 2012, 2(3):52-57, 6 pages.

Meng et al, "Templating route for synthesizing mesoporous zeolites with improved catalytic properties," Nano Today, Jun. 2009, 4(4):292-301, 10 pages.

Micromeritics [online], "AutoChem II 2920: The Catalyst Characterization Laboratory," AutoChem II brochure, accessed Sep. 30, 2019, URL: <https://www.micromeritics.com/Repository/Files/autochem2920-brochure-2017.pdf> 2007, 5 pages.

Prokesova et al, "Preparation of nanosized micro/mesoporous composites via simultaneous synthesis of Beta/MCM-48 phases," Microporous and Mesoporous Materials, Oct. 2003, 64(1-3):165-174, 10 pages.

Qin et al., "Mesoporous Y zeolite with homogeneous aluminum distribution obtained by sequential desilication-dealumination and its performance in the catalytic cracking of cumene and 1,3,5-triisopropylbenzene," Journal of Catalysis, Feb. 2011, 278:266-275, 10 pages.

Van Grieken et al, "Anomalous crystallization mechanism in the synthesis of nanocrystalline ZSM-5," Microporous Mesoporous Materials, Sep. 2000, 39(1-2):135-147, 13 pages.

Viswanadham et al., "Reaction pathways for the aromatization of paraffins in the presence of H-ZSM-5 and Zn/H-ZSM-5," Applied Catalysis A: General, Apr. 1996, 137(2):225-233, 9 pages.

Webb, "Introduction to Chemical Adsorption Analytical Techniques and their Applications to Catalysis," MIC Technical Publications, Micromeritics, Jan. 2003, 12 pages.

Xue et al., "Facile synthesis of nano-sized NH4-ZSM-5 zeolites," Microporous and Mesoporous Materials, Jul. 2012, 156:29-35, 7 pages.

Yang et al., "Incorporating platinum precursors into a NaA-zeolite synthesis mixture promoting the formation of nanosized zeolite," Microporous and Mesoporous Materials, Jan. 2009, 117(1-2):33-40, 8 pages.

Zhang et al., "Differences between ZSM-5 and ZSM-11 zeolite catalysts in 1-hexene aromatization and isomerization," Fuel Processing Technology, May 2010, 91(5):449-455, 7 pages.

Zhang et al., "Innovations in hierarchical zeolite synthesis," Catalysis Today, Apr. 2016, 264:3-15, 13 pages.

PCT International Search Report and Written Opinion in International Appln. No. PCT/US2020/063987, dated Mar. 15, 2021, 14 pages.

* cited by examiner

ACRYLOYL BASED POLYMERS WITH ACTIVE END CAP AS CORROSION INHIBITORS

CROSS-REFERENCE TO RELATED APPLICATIONS

This application is a divisional of and claims the benefit of priority to U.S. patent application Ser. No. 16/708,131, filed on Dec. 9, 2019.

BACKGROUND

Corrosion is the destruction of metals and alloys by chemical reactions with its environment. According to a recent report by the national association of corrosion engineers (NACE), the annual worldwide cost of corrosion is over $2.5 trillion USD.

Corrosion formation in oil and gas pipelines (production and transportation) poses serious concerns as corrosion can damage pipelines, equipment, and affect the operational facilities. A major source of corrosion in hydrocarbons are dissolved acid gases such as carbon dioxide ($CO_2$) or hydrogen sulfide ($H_2S$), which cause so-called sweet and sour corrosion, respectively, on metal surfaces. High salt concentrations in water produced with oil and gas will often cause or enhance corrosion. In oil and gas production, prevention of corrosion formation is required to avoid decreases in production.

Corrosion inhibitors may be added to mitigate corrosion during the production, transportation, and processing of hydrocarbons. The most corrosion inhibitor formulations for oil and gas industry are developed from amides, salts of nitrogenous molecules with carboxylic acids, nitrogen quaternaries, nitrogen heterocycles, and compounds containing P, S, and O atoms. Several organic or polymer products are used as corrosion inhibitors in oil and gas around the world. Further, the compatibility of corrosion inhibitors with kinetic hydrate inhibitors is valuable both of these inhibitors may be used at same time.

SUMMARY

An embodiment described in examples herein provides a polymer of the general formula:

In this formula, $R^1$ and $R^2$ are each independently chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from S, N, and O, or combination thereof. The divalent $C_4$-$C_7$ heteroaliphatic groups of $R^1$ and $R^2$ include one or two heteroatoms independently chosen from S, N, and O, and the maximum number of heteroatoms in $R^1$ or $R^2$ is two. $R^3$ is chosen from —OH, $NH_2$, —OH, —$OCH_3$, —$OCH_2$—$CH_3$, —NH—$CH_2$—$CH_3$, monovalent $C_4$-$C_7$ aliphatic groups and monovalent $C_4$-$C_7$ heteroaliphatic groups, optionally substituted with one or more $C_1$-$C_6$ aliphatic groups, heteroatoms independently chosen from S, N, and O, or combinations thereof, wherein the monovalent $C_4$-$C_7$ heteroaliphatic groups of $R^3$ include one or two heteroatoms independently chosen from S, N, and O. The maximum number of heteroatoms in $R^3$ is two. Z is a heteroatom selected from S, N, or O, or is an R4 group. $R^4$ are each independently chosen from —H, —$CH_2$—COOH, —$CH_2$—$CH_2$—$NH_2$, —$CH_2$—$CH_2$—$NH_3^+Cl^-$, —$CH_2$—$CH_2$—OH or —$CH_2$—$CH_2$—$CH_3$, or $CH_3$. The subscripts x, y, and z are molar fractions, wherein x is in a range chosen from 0.1 to 0.9, y is in the range chosen from 0.1 to 0.9, and z is in a range chosen from 0 to 0.8. The sum of x, y, and z equals 1.

Another embodiment provided in examples described herein provides a method for inhibiting corrosion. The method includes contacting a metal with at least one polymer of the general formula:

In this formula, $R^1$ and $R^2$ are each independently chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from S, N, and O, or combination thereof. The divalent $C_4$-$C_7$ heteroaliphatic groups of $R^1$ and $R^2$ include one or two heteroatoms independently chosen from S, N, and O the maximum number of heteroatoms in $R^1$ or $R^2$ is two. $R^3$ is chosen from —OH, $NH_2$, —OH, —$OCH_3$, —$OCH_2$—$CH_3$, —NH—$CH_2$—$CH_3$, monovalent $C_4$-$C_7$ aliphatic groups and monovalent $C_4$-$C_7$ heteroaliphatic groups, optionally substituted with one or more $C_1$-$C_6$ aliphatic groups, heteroatoms independently chosen from S, N, and O, or combinations thereof. The monovalent $C_4$-$C_7$ heteroaliphatic groups of $R^3$ include one or two heteroatoms independently chosen from S, N, and O. The maximum number of heteroatoms in $R^3$ is two. Z is a heteroatom selected from S, N, or O, or is an $R^4$ group. $R^4$ are each independently chosen from —H, —$CH_2$—COOH, —$CH_2$—$CH_2$—$NH_2$, —$CH_2$—$CH_2$—$NH_3^+Cl^-$, —$CH_2$—$CH_2$—OH or —$CH_2$—$CH_2$—$CH_3$, or $CH_3$. The subscripts x, y, and z represent molar fractions of the monomers. In the formula x is chosen from a range of 0.1 to 0.9, y is chosen from a range of 0.1 to 0.9, and z is chosen from a range of 0 to 0.8. The sum of x, y, and z equals 1.

Another embodiment provided in examples described herein provides a method for inhibiting corrosion. The method includes contacting a metal with at least one polymer of the general formula:

In this formula, $R^1$ and $R^2$ are each independently chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from S, N, and O, or combination thereof. The divalent $C_4$-$C_7$ heteroaliphatic groups of $R^1$ and $R^2$ include one or two heteroatoms independently chosen from S, N, and O the maximum number of heteroatoms in $R^1$ or $R^2$ is two. $R^3$ is chosen from —OH, $NH_2$, —OH, —$OCH_3$, —$OCH_2$—$CH_3$, —NH—$CH_2$—$CH_3$, monovalent $C_4$-$C_7$ aliphatic groups and monovalent $C_4$-$C_7$ heteroaliphatic groups, optionally substituted with one or more $C_1$-$C_6$ aliphatic groups, heteroatoms independently chosen from S, N, and O, or combinations thereof. The monovalent $C_4$-$C_7$ heteroaliphatic groups of $R^3$ include one or two heteroatoms independently chosen from S, N, and O. The maximum number of heteroatoms in $R^3$ is two. Z is a heteroatom selected from S, N, or O, or is an $R^4$ group. $R^4$ are each independently chosen from —H, —$CH_2$—COOH, —$CH_2$—$CH_2$—$NH_2$, —$CH_2$—$CH_2$—$NH_3^+Cl^-$, —$CH_2$—$CH_2$—OH or —$CH_2$—$CH_2$—$CH_3$, or $CH_3$. The subscripts x, y, and z represent molar fractions of the monomers. In the formula x is chosen from a range of 0.1 to 0.9, y is chosen from a range of 0.1 to 0.9, and z is chosen from a range of 0 to 0.8. The sum of x, y, and z equals 1.

DETAILED DESCRIPTION

Embodiments described herein provide an acryloyl polymer based corrosion inhibitor to mitigate corrosion especially in an acidic, environment. As described herein, an acidic environment has fluids that include 1% acidic components, 5% acidic components, or higher concentrations. Acidic components may include $H_2S$ and $CO_2$. The polymer based corrosion inhibitor can efficiently mitigate the corrosion during the production, transportation, and processing of in the presence of $H_2S$ and $CO_2$ environment. This corrosion inhibitor is based on homopolymers, copolymers, and terpolymers of acryloyl piperidine and acryloyl pyrrolidine. The polymers may include other monomers, such as acrylic monomers. The polymers are generally random copolymers or terpolymers and include, but are not limited to, linear, dendritic, branched, and block structures. Further, the polymers have end cap structure that enhance adhesion to metallic surfaces, increasing their corrosion protection over previous polymers.

While the following terms are believed to be well understood by one of ordinary skill in the art, definitions are set forth to facilitate explanation of the present-disclosed subject matter.

The term "copolymer" refers to a polymer having two different monomeric repeating units. In one or more embodiments, the copolymers are random. As will be appreciated by one of ordinary skill in the art, the copolymers are random when the distribution of monomeric repeating units follows statistical laws. For example, copolymers are random when the probability of finding a given monomeric repeating unit at a particular point in the polymer chain is equal to the mole fraction of that monomeric repeating unit in the chain. Random copolymers may also be referred to as statistical copolymers. Similarly, the term "terpolymer" refers to a polymer having three different monomeric repeating units.

The term "monovalent" refers to a radical having an unsatisfied valence of one, where a valence, represented in drawings herein by a "—", is unsatisfied at one end of the radical. For example, when a hydrocarbon group is present at one end of an aliphatic radical or a heteroaliphatic radical, the aliphatic radical or the heteroaliphatic radical is monovalent after one hydrogen atom has been removed from the hydrocarbon group present at one end of the aliphatic radical or the heteroaliphatic radical. As another example, when a heteroatom is present at one end of the heteroaliphatic radical, the heteroaliphatic radical is monovalent when the heteroatom present at one end of the heteroaliphatic radical has an unsatisfied valence.

The term "divalent" refers to a radical having an unsatisfied valence of two, where a valence is unsatisfied at two ends of the radical. For example, when a hydrocarbon group is present at two ends of an aliphatic radical or a heteroaliphatic radical, the aliphatic radical or the heteroaliphatic radical is divalent after one hydrogen atom has been removed from each of the hydrocarbon groups present at the ends of the aliphatic radical or the heteroaliphatic radical. As another example, when a heteroatom is present at two ends of the heteroaliphatic radical, the heteroaliphatic radical is divalent when each of the heteroatoms present at two ends of the heteroaliphatic radical has an unsatisfied valence. Similarly, as another example, when a hydrocarbon group is present at one end of a heteroaliphatic radical and a heteroatom is present at one end of the heteroaliphatic radical, the heteroaliphatic radical is divalent after one hydrogen atom has been removed from the hydrocarbon group present at one end of the heteroaliphatic radical and when the heteroatom present at one end of the heteroaliphatic radical has an unsatisfied valence The term "aliphatic" refers to saturated carbon radicals, which may be in either a linear or branched structure. The aliphatic hydrocarbon radicals may be monovalent or divalent. As described herein, aliphatic includes, but is not limited to, alkyl moieties. Thus, the term "alkyl" includes straight and branched alkyl groups. The term "lower alkyl" may be used to indicate alkyl groups (branched or unbranched) having from 1 to 6 carbon atoms.

In some embodiments, the alkyl groups described contain from 1 to 7 aliphatic carbon atoms. In other embodiments, the alkyl groups described contain from 1 to 5 aliphatic carbon atoms. In still other embodiments, the alkyl groups described contain from 1 to 3 aliphatic carbon atoms. Illustrative aliphatic groups thus include, but are not limited to, for example, methyl, ethyl, n-propyl, isopropyl, allyl, n-butyl, sec-butyl, isobutyl, tert-butyl, n-pentyl, sec-pentyl, isopentyl, tert-pentyl, n-hexyl, sec-hexyl, moieties and the like.

The term "heteroaliphatic" refers to aliphatic radicals in which one or more carbon atoms in the main chain have been substituted with a heteroatom. By way of example, an aliphatic radical having four main chain atoms where one carbon atom has been substituted with one heteroatom is referred to as a $C_4$ heteroaliphatic. As another example, an aliphatic radical having seven main chain atoms where two carbon atoms have been substituted with two heteroatoms is referred to as a C7 heteroaliphatic. In some embodiments, the heteroaliphatic radicals are monovalent or divalent. Thus, heteroaliphatic includes aliphatic chains which contain one or more oxygen, sulfur, or nitrogen atoms, for example, in place of carbon atoms. Heteroaliphatic moieties may be linear or branched.

The term "heterocycloalkyl," "heterocycle," or "heterocyclic" refers to radicals that combine the properties of heteroaliphatic and cyclic moieties and include, but are not limited to, saturated mono- or polycyclic ring systems having from 5 to 8 atoms, where at least one ring atom is a N heteroatom; and where zero, one or two ring atoms are additional heteroatoms independently chosen from S, O, and N. The nitrogen and sulfur heteroatoms may optionally be oxidized. In some embodiments, the terms heterocycloalkyl, heterocycle or heterocyclic refer to non-aromatic 5-membered, 6-membered, or 7-membered rings or polycyclic moieties where at least one ring atom is an N heteroatom, and where zero, one or two ring atoms are additional heteroatoms independently chosen from S, O, and N. The nitrogen and sulfur heteroatoms may optionally be oxidized and the nitrogen atom may be quarternized. This includes, but is not limited to, bicyclic or tricyclic groups. Representative heterocycles include, but are not limited to, heterocycles such as pyrrolidinyl, pyrazolidinyl, imidazolidinyl, piperidinyl, piperazinyl, oxazolidinyl, isoxazolidinyl, morpholinyl, thiazolidinyl, isothiazolidinyl, dithiazolyl, dithiazolidinyl, and azepanyl. In embodiments, the heterocycloalkyls, heterocycles, or heterocyclics are saturated mono- or polycyclic moieties having from 5 to 8 ring atoms of which one ring atom is N. In the mono- or polycyclic moieties, zero, one or two ring atoms are additional heteroatoms independently chosen from S, O, and N. The remaining ring atoms are carbon, and the radicals are joint to the rest of the molecule via an N ring atom, such as, for example, pyrollidinyl, pyrazolidinyl, imidazolidinyl, piperidinyl, piperazinyl, morpholinyl, thiazolidinyl, and azepanyl.

The term "corrosion" refers to a degradation process affecting metals. During corrosion, a metal surface is converted into a different chemical form, such as an oxide, a hydroxide, or a sulfide. Corrosion is usually caused by electrochemical oxidation of the metal surface, but can also be caused by attack from acids, or both. Surface protection may be used to protect from corrosion, including, for example, passivation, galvanization, and other coding techniques. Some metals and alloys are inherently less vulnerable to corrosion, for example, forming protective oxide surfaces. Corrosion may be enhanced in environments that provide conductivity, such as seawater, brines, and the like. Corrosion may also be enhanced by exposure to acidic gases, such as hydrogen sulfide and carbon dioxide.

The acryloyl based polymers are copolymers and terpolymers with cyclic substituent groups with a general formula $[CH_2-CH(-CO-NR^1)]_x-[CH_2-CH(-CO-NR^2)]_y-[CH_2-CH(-CO-NR^3)]_z-ZR^4$. The terms x, y, and z represent the composition fractions of the respective monomers in the polymer. The terms y and z are 0 in the case of homopolymers, x+y=1 in the case of copolymers, and x+y+z=1 in the case of terpolymers. $R^1$, $R^2$, and $R^3$ independently represent ring structures of 5 to 8 atoms with or without one or more heteroatoms not limited to S, O and N atoms. Z is a hetero atom, such as S or N, and $R^4$ represents one or more alkyl groups with amine, quaternary ammonium and carboxylic acid substituents. The general structure of the polymers may be represented as:

In this structure, x is a molar fraction range between about 0.1 and about 0.9, y is a molar fraction range between about 0.1 and about 0.9, and z is a molar fraction range between about zero and about 0.4, where the sum of x, y, and z is equal to one.

These polymers have multiple functional groups and heteroatoms, such as N and S, to provide multiple sites of interaction with the metal surface to form a stable corrosion inhibition film. Further, the end cap, $—ZR^4$, increases the efficacy over polymers lacking the end cap. In various embodiments, the polymers have molecular weights between about 500 Da and about 5,000 Da and work effectively as corrosion inhibitor. The acryloyl polymers also work as combined inhibitor, for example, against both corrosion and gas hydrate. Accordingly, the combined inhibitor application of these polymers eliminate the compatibility issue of these inhibitors with corrosion inhibitors.

Acryloyl-Based Copolymers with Active End Cap

In the copolymers and terpolymers described herein, $R^1$ and $R^2$ are each independently selected from divalent $C_4$-$C_7$ aliphatic groups and divalent $C_4$-$C_7$ heteroatom groups. In some embodiments, substituents of $C_1$-$C_6$ aliphatic groups, heteroatoms independently chosen from S, N, and O, or combinations thereof may be present. If present, the heteroaliphatic groups of $R^1$ and $R^2$ include one or two heteroatoms independently chosen from S, N, and O, wherein the maximum number of heteroatoms is two.

In the copolymers, $R^1$ and $R^2$ are independently chosen from divalent $C_4$-$C_7$ aliphatic groups and divalent $C_4$-$C_7$ heteroaliphatic groups, which may be substituted with one or more $C_1$-$C_6$ aliphatic groups, heteroatoms independent chosen from S, N, and O, or combinations thereof, where the divalent $C_4$-$C_7$ heteroaliphatic groups of $R^1$ or $R^2$ include one or two heteroatoms independently chosen from S, N, and O, and the maximum number of heteroatoms is two. In various embodiments, $R^1$ and $R^2$ are independently chosen from divalent $C_4$-$C_7$ linear aliphatic groups, divalent $C_4$-$C_7$ branch aliphatic groups, divalent $C_4$-$C_7$ linear heteroaliphatic groups, and divalent $C_4$-$C_7$ branched heteroaliphatic groups. In various embodiments, $R^1$ and $R^2$ are independently chosen from divalent $C_4$-$C_6$ linear aliphatic groups and divalent $C_4$-$C_6$ linear heteroaliphatic groups. In various embodiments, $R^1$ and $R^2$ are independently chosen from divalent $C_4$-$C_6$ linear heteroaliphatic groups including one heteroatom, wherein the heteroatom is O. In some embodiments, $R^1$ and $R^2$ are independently $—(CH_2)_4—$, $—(CH_2)_5—$, and $—(CH_2)_2—O—(CH_2)_2—$.

In some embodiments, $R^1$ or $R^2$ are independently substituted with one or more substituents. In embodiments where substituents are present, $R^1$ or $R^2$ may independently include from 1 to 3 substituting groups. In embodiments where R¹ or R² is chosen from divalent $C_4$-$C_7$ aliphatic groups and divalent $C_4$-$C_7$ heteroaliphatic groups and is substituted with one or more substituting groups, the divalent $C_4$-$C_7$ aliphatic groups and the divalent $C_4$-$C_7$ heteroaliphatic groups include additional unsatisfied valences within the divalent $C_4$-$C_7$ aliphatic groups and the divalent $C_4$-$C_7$ heteroaliphatic groups to accommodate bonding with the substituting groups. For example, in embodiments where R¹ or R² is chosen from divalent $C_4$-$C_7$ aliphatic groups and divalent $C_4$-$C_7$ heteroaliphatic groups and is substituted, additional hydrogen atoms may have been removed from the hydrocarbon groups present within the divalent $C_4$-$C_7$ aliphatic groups and the divalent $C_4$-$C_7$ heteroaliphatic groups to accommodate bonding with the substituting groups.

In some embodiments, R¹ or R² are independently substituted with one or more $C_1$-$C_6$ aliphatic groups, heteroatoms independently chosen from S, N, and O, or combination thereof. In some embodiments, R¹ or R² are independently substituted with one or more $C_1$-$C_6$ linear aliphatic groups, $C_1$-$C_6$ branched aliphatic groups, heteroatoms independently chosen from S, N, and O, or combinations thereof. In some embodiments, R¹ or R² are independently substituted with one or more $C_1$-$C_6$ linear aliphatic groups, $C_1$-$C_6$ branched aliphatic groups, or combination thereof. In some embodiments, R¹ or R² are independently substituted with one or more lower alkyls. In some embodiments, R¹ or R² are independently substituted with one or more $C_1$-$C_3$ linear aliphatic groups, $C_1$-$C_3$ branched aliphatic groups, or combination thereof. In some embodiments, R¹ or R² are independently substituted with one or more substituting groups independently chosen from methyl, ethyl, n-propyl, isopropyl, allyl moieties, or combinations thereof.

In other embodiments, R¹ or R² are independently substituted with one or more heteroatoms independently chosen from S, N, and O. In embodiments, where R¹ or R² are independently substituted with one or more heteroatoms independently chosen from S, N, and O, the heteroatoms may form a single bond or a double bond with R¹ or R². In an embodiment, R¹ is substituted with one heteroatom chosen from S, N, and O. In another embodiment, R¹ is substituted with one heteroatom, where the one heteroatom is O.

In embodiments where R¹ or R² is a divalent $C_4$-$C_7$ aliphatic group or a divalent $C_4$-$C_7$ heteroaliphatic group, the $C_4$-$C_7$ aliphatic groups and the $C_4$-$C_7$ heteroaliphatic groups include an unsatisfied valence at two ends. In this way, R¹ or R² forms a heterocycloalkyl or a heterocycle when bonded with the —N— in the rest of the copolymer molecule via its two unsatisfied end valences. In embodiments, the heterocycloalkyl or heterocycle formed when R¹ or R² is bonded with the —N— in the rest of the copolymer is non-aromatic. In an embodiment, the heterocycloalkyl or heterocycle formed is chosen from pyrollidinyl, pyrazolidinyl, imidazolidinyl, piperidinyl, piperazinyl, morpholinyl, thiazolidinyl, and azepanyl. In an embodiment, the heterocycloalkyl, or heterocycle formed is chosen from pyrrolidinyl, piperidinyl, morpholinyl, and azepanyl.

Based on the discussion of the possible selections for R¹ and R², each of the ring structures, —NR¹ and —NR² can be, independently, any of the following structures:

In various embodiments, —NR¹ or —NR² are, independently:

R³ may be either a cyclic structure or an acyclic structure. When R³ is a cyclic structure, it may be a nitrogen heterocyclic ring, selected as described with respect to NR¹ and NR². In embodiments where R³ is an acyclic structure, R³ may be $NH_2$, —OH, —$OCH_3$, —$OCH_2$—$CH_3$, —NH—$CH_2$—$CH_3$ or other substituent based on a heteroatom. In some embodiments, R³ is a monovalent $C_4$-$C_7$ aliphatic group or a monovalent $C_4$-$C_7$ heteroaliphatic group. In some embodiments, R³ is substituted with one or more substituents. In embodiments where substituents are present, R³ may include from 1 to 3 substituting groups. In embodiments where R³ is chosen from monovalent $C_4$-$C_7$ aliphatic groups and monovalent $C_4$-$C_7$ heteroaliphatic groups and is substituted with one or more substituting groups, the monovalent $C_4$-$C_7$ aliphatic groups and the monovalent $C_4$-$C_7$ heteroaliphatic groups include additional unsatisfied valences within the monovalent $C_4$-$C_7$ aliphatic groups and the monovalent $C_4$-$C_7$ heteroaliphatic groups to accommodate bonding with the substituting groups. For example, in embodiments where $R^3$ is chosen from monovalent $C_4$-$C_7$ aliphatic groups and monovalent $C_4$-$C_7$ heteroaliphatic groups and is substituted, additional hydrogen atoms may have been removed from the hydrocarbon groups present within the monovalent $C_4$-$C_7$ aliphatic groups and the monovalent $C_4$-$C_7$ heteroaliphatic groups to accommodate bonding with the substituting groups.

In some embodiments, $R^3$ is substituted with one or more $C_1$-$C_6$ aliphatic groups, heteroatoms independently chosen from S, N, and O, or combinations thereof. In some embodiments, $R^3$ is substituted with one or more $C_1$-$C_6$ linear aliphatic groups, $C_1$-$C_6$ branched aliphatic groups, heteroatoms independently chosen from S, N, and O, or combinations thereof. In some embodiments, $R^3$ is substituted with one or more $C_1$-$C_6$ linear aliphatic groups, $C_1$-$C_6$ branched aliphatic groups, or combination thereof. In some embodiments, $R^3$ is substituted with one or more lower alkyls. In some embodiments, $R^3$ is substituted with one or more $C_1$-$C_3$ linear aliphatic groups, $C_1$-$C_3$ branched aliphatic groups, or combinations thereof. In some embodiments, $R^3$ is substituted with one or more substituting groups independently chosen from methyl, ethyl, n-propyl, isopropyl, allyl moieties, or combinations thereof.

In other embodiments, $R^3$ is substituted with one or more heteroatoms independently chosen from S, N, and O. In embodiments, where $R^3$ is substituted with one or more heteroatoms independently chosen from S, N, and O, the heteroatoms may form a single bond or a double bond with $R^3$. In an embodiment, $R^3$ is substituted with one heteroatom chosen from S, N, and O. In another embodiment, $R^3$ is substituted with one heteroatom, where the one heteroatom is O.

The end cap structure, —$ZR^4$, increases the adhesion of the polymer chains to a metal surface, and, thus, increases the protection of the metals from corrosion. In the end cap structure, Z is a heteroatom, such as N, S, or O. In some embodiments, Z is N or S. $R^4$ may independently be —H, —$CH_2$—COOH, —$CH_2$—$CH_2$—$NH_2$, —$CH_2$—$CH_2$—$NH_3^+Cl^-$, —$CH_2$—$CH_2$—OH or —$CH_2$—$CH_2$—$CH_3$. The selection of the heteroatom changes the corrosion protection with a sulfur heteroatom providing the most protection. The correlation of the protection to the heteroatom is S>N>O.

In some embodiments, the end cap structure is a chain terminating agent (CTA), reacting with a free radical during polymerization to stop the reaction while coupling to the end of the chain. The four different CTAs (2-merceptoethanol, 1-propanethiol, cysteamine and thioglycolic acid were used for different end groups. In other embodiments, the end cap is part of a free radical initiator, initiating the polymerization while coupling to the chains.

EXAMPLES

Example 1

Synthesis of Poly(N-pyrolidine acrylamide-co-N piperidine acrylamide)-Thioglycolic Acid The example-1 polymer was synthesized adding N-Acryloyl pyrrolidine (2.02 g, 14.5 mmol), N-Acryloyl piperidine (14.5 mmol, 1.81 g), initiator 4,4-Azobis (4-cyanovaleric acid, 0.5 mmol, 0.14 g), thioglycolic acid (5.6 mmol, 0.5 g), and water 15 ml in a round bottom flask to form a reaction mixture. The reaction mixture was heated at 65° C. under $N_2$ for 6 hours, after elapsed time reaction mixture was cooled to room temperature and washed with diethyl ether. The final aqueous layer was freeze dried to obtain the final polymer as a solid white powder (NCI-1, polymer example-1).

Example 2

Synthesis of Poly(N-pyrolidine acrylamide-co-N piperidine acrylamide)-Cysteamine The example-2 polymer was synthesized adding N-Acryloyl pyrrolidine (2.02 g, 14.5 mmol), N-Acryloyl piperidine (14.5 mmol, 1.81 g), initiator 4,4-Azobis (4-cyanovaleric acid, 0.5 mmol, 0.14 g), cysteamine (15.5 mmol, 1.2 g), and water 15 ml in a round bottom flask to form a reaction mixture. The reaction mixture was heated at 65° C. under $N_2$ for 6 hours, after elapsed time reaction mixture was cooled to room temperature and washed with diethyl ether. The final aqueous layer was freeze dried to obtain the final polymer as a gel like material (NCI-2, polymer example-2).

Example 3

Synthesis of Poly(N-pyrolidine acrylamide-co-N piperidine acrylamide)-2-merceptoethanol The example-3 polymer was synthesized adding N-Acryloyl pyrrolidine (2.02 g, 14.5 mmol), N-Acryloyl piperidine (14.5 mmol, 1.81 g), initiator 4,4-Azobis (4-cyanovaleric acid, 0.5 mmol, 0.14 g), 2-merceptoethanol (15.3 mmol, 1.2 g), and water 15 ml in a round bottom flask to form a reaction mixture. The reaction mixture was heated at 65° C. under $N_2$ for 6 hours, after elapsed time reaction mixture was cooled to room temperature and washed with diethyl ether. The final aqueous layer was freeze dried to obtain the final polymer as a solid white powder (NCI-3, polymer example-3).

Example 4

Synthesis of Poly(N-pyrolidine acrylamide-co-N piperidine acrylamide)-1-propanethiol The example-4 polymer was synthesized adding N-Acryloyl pyrrolidine (2.02 g, 14.5 mmol), N-Acryloyl piperidine (14.5 mmol, 1.81 g), initiator 4,4-Azobis (4-cyanovaleric acid, 0.5 mmol, 0.14 g), 1-propanethiol (15.5 mmol, 1.5 g), and water 15 ml in a round bottom flask to form a reaction mixture. The reaction mixture was heated at 65° C. under $N_2$ for 6 hours, after elapsed time reaction mixture was cooled to room temperature and washed with diethyl ether. The final aqueous layer was freeze dried to obtain the final polymer as a solid white powder (NCI-4, polymer example-4).

Example 5

Synthesis of Poly(N-pyrolidine acrylamide-co-N piperidine)

The example-5 polymer was synthesized adding N-Acryloyl pyrrolidine (2.02 g, 14.5 mmol), N-Acryloyl piperidine (14.5 mmol, 1.81 g), initiator 4,4-Azobis (4-cyanovaleric acid, 0.5 mmol, 0.14 g) and water 15 ml in a round bottom flask to form a reaction mixture. The reaction mixture was heated at 65° C. under $N_2$ for 6 hours, after elapsed time reaction mixture was cooled to room temperature and washed with diethyl ether. The final aqueous layer was freeze dried to obtain the final polymer as a solid white powder (NCI-5, polymer example-5).

Example 6

Synthesis of Poly(N-pyrolidine acrylamide-co-N piperidine acrylamide-co-N-Isopropyl acrylamide)

The example-6 polymer was synthesized adding N-Acryloyl pyrrolidine (2.02 g, 14.5 mmol), N-Acryloyl piperidine (14.5 mmol, 1.81 g), N-Isopropyl acrylamide (7.0 mmol, 0.8 g), initiator 4,4-Azobis (4-cyanovaleric acid, 0.6 mmol, 0.17 g), thioglycolic acid (5.6 mmol, 0.5 g), and water 15 ml in a round bottom flask to form a reaction mixture. The reaction mixture was heated at 65° C. under $N_2$ for 6 hours, after elapsed time reaction mixture was cooled to room temperature and washed with diethyl ether. The final aqueous layer was freeze dried to obtain the final polymer as a solid white powder (NCI-6, polymer example-6).

Characterization of Polymers: The synthesized polymers were characterized using techniques of $^1H$ and $^{13}C$ nuclear magnetic resonance (NMR) spectroscopy. Nuclear magnetic resonance (NMR) spectroscopy is a powerful method for structure elucidation of polymers in terms of percentage of monomers incorporation in the final polymer. A suitable NMR analysis includes a 600 MHz Jeol Resonance NMR system. The $^1H$ and $^{13}C$ analyses were carried out using $D_2O$ solvent. The polymer back bone peak is present at (1 ppm-2 ppm)

Measurement of Corrosion Inhibition Though Linear Polarization Resistance (LPR)

The LPR measurement was conducted in 3.5% sodium chloride (NaCl) solution at 60° C. using ASTM method G59-97 for LPR tests. The $CO_2$ gas was continuously purging in the corrosion cell during the exposure time at constant rate (25 ml/min) and tested material is carbon steel C1018. The experimental set up used a corrosion cell connected to a potentiostat, such as the PARSTAT 4000 available from Ametek Scientific Instruments of. The LPR measurements were carried out using a glass setup with the volume capacity of 0.85 liter (L). The carbon steel coupon exposed surface area (9 centimeter) was used to measure the corrosion for 24 hours. The applied potential of LPR versus open circuit potential is 10 mV. As a conductive solvent to be used in the measurement, a brine was mixed up with the composition shown in Table 1.

TABLE 1 brine water composition

| Component | Chemical Formula | Concentration (%) |
|---|---|---|
| Sodium chloride | NaCl | 3.5 |
| Water | $H_2O$ | 96.5 |

Table 2 is a list of the corrosion inhibitors tested to measure their corrosion inhibition efficiency through LPR using the standard brine composition given in Table 1. As shown in Table 2, four commercial corrosion inhibitors (CCI (1-4)) and 6 disclosed corrosion inhibitor (NCI-1 to 6, Polymer of Example-1 to 6).

Figure 1:
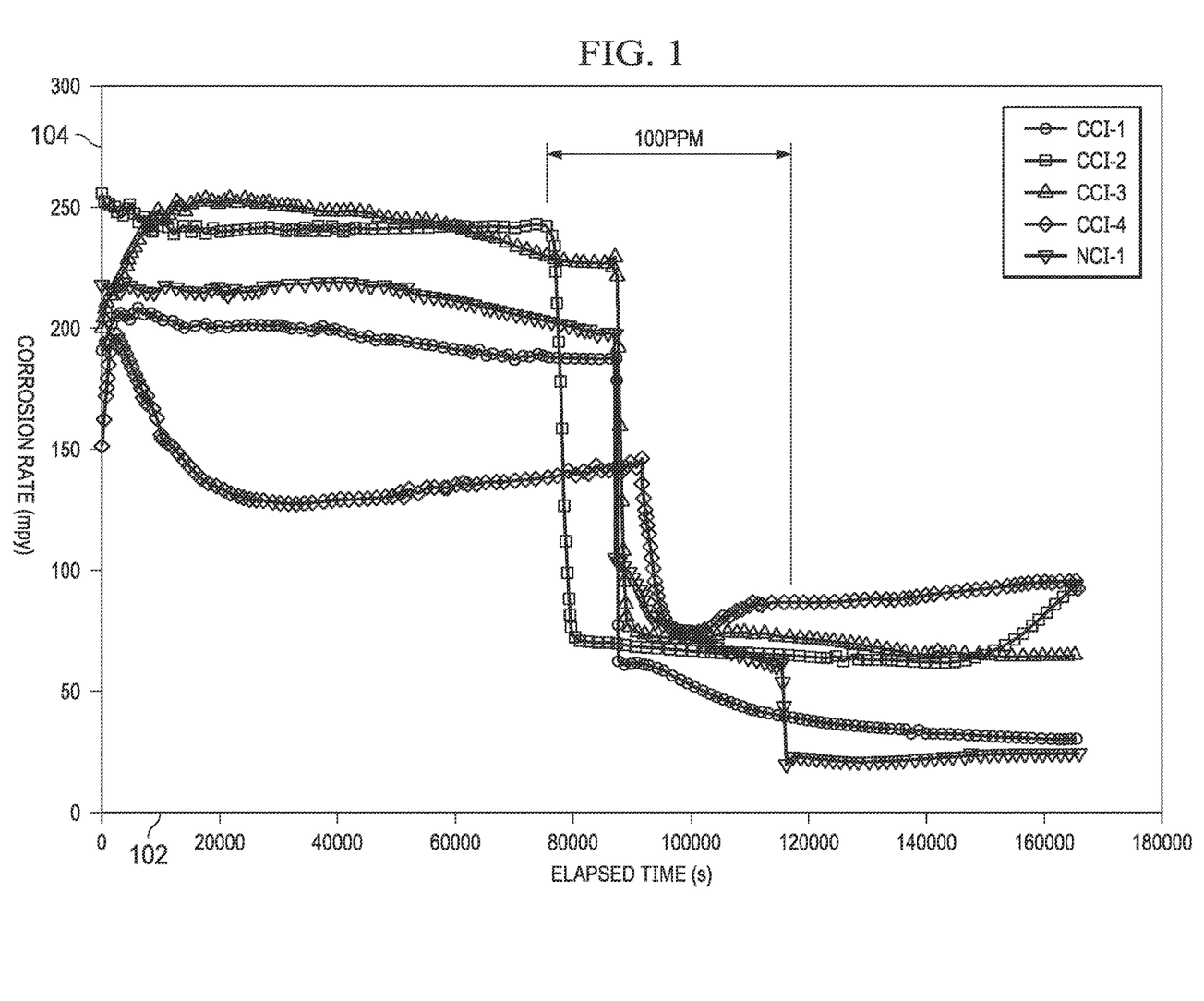
FIG. 1 is a corrosion rate plot of the some of the test samples shown in Table 2.

FIG. 1 is a corrosion rate plot of some of the test samples shown in Table 2. In this plot, the x-axis represents elapsed time 102 in seconds, while the y-axis represents corrosion rate 104 in mils penetration per year (mpy).

TABLE 2 corrosion inhibitors tested.

| Commercial Corrosion Inhibitors | New Disclosed corrosion Inhibitor |
|---|---|
| CCI-1 | NCI-1 (Polymer of example-1) |
| CCI-2 | NCI-2 (Polymer of example-2) |
| CCI-3 | NCI-3 (Polymer of example-3) |
| CCI-4 | NCI-4 (Polymer of example-4) |
|  | NCI-5 (Polymer of example-5) |
|  | NCI-6 (Polymer of example-6) |

An initial 50 parts per million (ppm) aliquot of the corrosion inhibitors described in Table-2 were injected after a stable baseline is obtained for each corrosion inhibitor sample. After 4 hrs. from the first injection, another injection of 50 ppm of corrosion inhibitor was injected and corrosion rate was observed till the end of experiment for all corrosion inhibitors mentioned in Table 2. Total of 100 ppm was used for all corrosion inhibitors. Concertation of corrosion inhibitor was injected twice, one after a day of exposure and second is 4 hours after the first injection. Data acquisition is completed with software to enable measurement of the time and corrosion rate.

Figure 2:
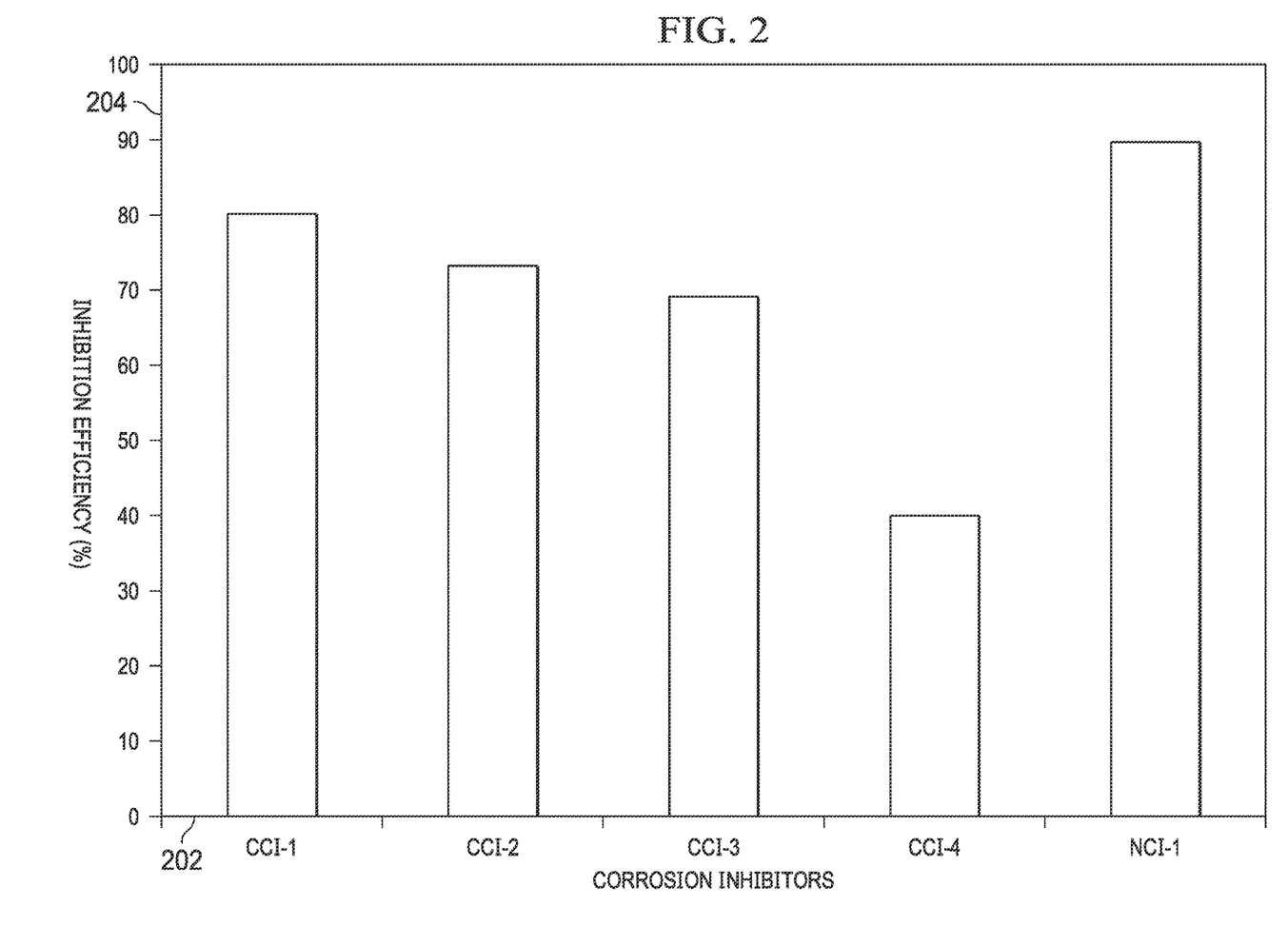
FIG. 2 is a plot of efficacy of the different corrosion inhibitors tested.

FIG. 2 is a plot of efficacy of the different corrosion inhibitors tested. In FIG. 2, the different corrosion inhibitors are defined along the x-axis 202, while the inhibition efficiency 204, in percent, is shown along the y-axis. The corrosion Inhibition efficiency (IE) of each inhibitor was calculated using the following equation (1):

$$\text{Inhibition Efficiency \%} = \left(\frac{\text{corrosin rate without inhibitor} - \text{corrosin rate with inhibitor}}{\text{Corrosion rate without inhibitor}}\right) \times 100 \quad (1)$$

The corrosion inhibition results shown in the FIG. 2 indicate that, under the test conditions herein, the test corrosion inhibitor, NCI-1, has better corrosion inhibitor efficiency/activity than the conventional commercial corrosion inhibitors used in oil and gas industry.

An embodiment described in examples herein provides a polymer of the general formula:

In this formula, $R^1$ and $R^2$ are each independently chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from S, N, and O, or combination thereof. The divalent $C_4$-$C_7$ heteroaliphatic groups of $R^1$ and $R^2$ include one or two heteroatoms independently chosen from S, N, and O, and the maximum number of heteroatoms in $R^1$ or $R^2$ is two. $R^3$ is chosen from —OH, $NH_2$, —OH, —$OCH_3$, —$OCH_2$—$CH_3$, —NH—$CH_2$—$CH_3$, monovalent $C_4$-$C_7$ aliphatic groups and monovalent $C_4$-$C_7$ heteroaliphatic groups, optionally substituted with one or more $C_1$-$C_6$ aliphatic groups, heteroatoms independently chosen from S, N, and O. or combinations thereof, wherein the monovalent $C_4$-$C_7$ heteroaliphatic groups of $R^3$ include one or two heteroatoms independently chosen from S, N, and O. The maximum number of heteroatoms in $R^3$ is two. Z is a heteroatom selected from S, N, or O. or is an R4 group. $R^4$ are each independently chosen from —H, —$CH_2$—COOH, —$CH_2$—$CH_2$—$NH_2$, —$CH_2$—$CH_2$—$NH_3^+Cl^-$, —$CH_2$—$CH_2$—OH or —$CH_2$—$CH_2$—$CH_3$, or $CH_3$. The subscripts x, y, and z are molar fractions, wherein x is in a range chosen from 0.1 to 0.9, y is in the range chosen from 0.1 to 0.9, and z is in a range chosen from 0 to 0.8. The sum of x, y, and z equals 1.

In an aspect, $R^1$ is chosen from divalent $C_4$-$C_6$ linear heteroaliphatic groups. In an aspect, $R^2$ is chosen from divalent $C_4$-$C_6$ linear heteroaliphatic groups. In an aspect, $R^3$ is chosen from monovalent $C_3$-$C_7$ linear heteroaliphatic groups. In an aspect, $R^3$ is chosen from monovalent $C_3$-$C_7$ linear aliphatic groups.

In an aspect, —$NR^1$ includes a piperidine ring. In an aspect, —$NR^2$ includes a pyrrolidine ring. In an aspect, —$NR^1$ includes a piperidine ring and —$NR^2$ includes a pyrrolidine ring. In an aspect, —$NR^1$ includes a piperidine ring, —$NR^2$ includes a pyrrolidine ring, and —$NR^3$ includes a monovalent $C_3$-$C_7$ linear heteroaliphatic group.

In an aspect, z is 0. In an aspect, Z is selected from S, O, or N. In an aspect, Z is S.

In an aspect, $R^4$ is selected from —H, —$CH_2$—COOH, —$CH_2$—$CH_2$—$NH_3^+Cl^-$, and —$CH_3$. In an aspect, $R^4$ is —$CH_2$—$CH_2$—$NH_3^+Cl^-$ In an aspect, the polymer includes acryloyl piperidine and acryloyl pyrrolidine monomer units. In an aspect, the polymer includes acryloyl piperidine, acryloyl pyrrolidine, and acrylic monomer units.

Another embodiment provided in examples described herein provides a method for inhibiting corrosion. The method includes contacting a metal with at least one polymer of the general formula:

In this formula, $R^1$ and $R^2$ are each independently chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from S, N, and O, or combination thereof. The divalent $C_4$-$C_7$ heteroaliphatic groups of $R^1$ and $R^2$ include one or two heteroatoms independently chosen from S, N, and O the maximum number of heteroatoms in $R^1$ or $R^2$ is two. $R^3$ is chosen from —OH, $NH_2$, —OH, —$OCH_3$, —$OCH_2$—$CH_3$, —NH—$CH_2$—$CH_3$, monovalent $C_4$-$C_7$ aliphatic groups and monovalent $C_4$-$C_7$ heteroaliphatic groups, optionally substituted with one or more $C_1$-$C_6$ aliphatic groups, heteroatoms independently chosen from S, N, and O, or combinations thereof. The monovalent $C_4$-$C_7$ heteroaliphatic groups of $R^3$ include one or two heteroatoms independently chosen from S, N, and O. The maximum number of heteroatoms in $R^3$ is two. Z is a heteroatom selected from S, N, or O, or is an $R^4$ group. $R^4$ are each independently chosen from —H, —$CH_2$—COOH, —$CH_2$—$CH_2$—$NH_2$, —$CH_2$—$CH_2$—$NH_3^+Cl^-$, —$CH_2$—$CH_2$—OH or —$CH_2$—$CH_2$—$CH_3$, or $CH_3$. The subscripts x, y, and z represent molar fractions of the monomers. In the formula x is chosen from a range of 0.1 to 0.9, y is chosen from a range of 0.1 to 0.9, and z is chosen from a range of 0 to 0.8. The sum of x, y, and z equals 1.

In an aspect, the polymer is added to a fluid in contact with the metal. In an aspect, the fluid includes a brine. In an aspect, the fluid includes $CO_2$, $H_2S$, or both. In an aspect, the fluid includes a crude oil. In an aspect, the fluid includes a natural gas.

Other implementations are also within the scope of the following claims.

What is claimed is:

1. A method for inhibiting corrosion, the method comprising:
   contacting a metal with at least one polymer of the general formula:

wherein $R^1$ are and $R^2$ are each independently divalent $C_4$-$C_7$ aliphatic groups or divalent $C_4$-$C_7$ heteroaliphatic groups, optionally substituted with one or more $C_1$-$C_6$ aliphatic groups, heteroatoms independently chosen from S, N, and O, or combination thereof, wherein the divalent $C_4$-$C_7$ heteroaliphatic groups of $R^1$ and $R^2$ comprise one or two heteroatoms independently selected from the group consisting of S, N, and O, and the maximum number of heteroatoms in $R^1$ or $R^2$ is two;

$R^3$ is selected from the group consisting of —OH, $NH_2$, —$OCH_3$, —$OCH_2$—$CH_3$, —NH—$CH_2$—$CH_3$, monovalent $C_4$-$C_7$ aliphatic groups and monovalent $C_4$-$C_7$ heteroaliphatic groups, optionally substituted with one or more $C_1$-$C_6$ aliphatic groups, heteroatoms independently selected from the group consisting of S, N, and O, or combinations thereof, wherein the monovalent $C_4$-$C_7$ heteroaliphatic groups of $R^3$ comprise one or two heteroatoms independently selected from the group consisting of S, N, and O, and the maximum number of heteroatoms in $R^3$ is two;

Z is a heteroatom selected the group consisting of S, N, O, and $R^4$;

$R^4$ are each independently selected from the group consisting of —H, —$CH_2$—COOH, —$CH_2$—$CH_2$—$NH_2$, —$CH_2$—$CH_2$—$NH_3^+Cl^-$, —$CH_2$—$CH_2$—OH, —$CH_2$—$CH_2$—$CH_3$, and $CH_3$;

x is a molar fraction range chosen from 0.1 to 0.9;
y is a molar fraction range chosen from 0.1 to 0.9; and
z is a molar fraction range chosen from 0 to 0.8, wherein the summation of x, y, and z equals 1.

2. The method of claim 1, wherein the polymer is added to a fluid in contact with the metal.

3. The method of claim 2, wherein the fluid comprises a brine.

4. The method of claim 2, wherein the fluid comprises $CO_2$, $H_2S$, or both.

5. The method of claim 2, wherein the fluid comprises a crude oil.

6. The method of claim 2, wherein the fluid comprises a natural gas.

* * * * *